(12) United States Patent
Imaoka et al.

(10) Patent No.: US 10,119,486 B2
(45) Date of Patent: Nov. 6, 2018

(54) ENGINE CONTROL DEVICE AND ENGINE CONTROL METHOD

(71) Applicant: NISSAN MOTOR CO., LTD., Yokohama-shi, Kanagawa (JP)

(72) Inventors: Yoshihiro Imaoka, Kanagawa (JP); Takeshi Tsuyuki, Kanagawa (JP); Takao Inoue, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/565,211

(22) PCT Filed: Apr. 14, 2015

(86) PCT No.: PCT/JP2015/061497
§ 371 (c)(1),
(2) Date: Oct. 9, 2017

(87) PCT Pub. No.: WO2016/166818
PCT Pub. Date: Oct. 20, 2016

(65) Prior Publication Data
US 2018/0080400 A1   Mar. 22, 2018

(51) Int. Cl.
*F02D 41/02* (2006.01)
*F02D 41/06* (2006.01)
(Continued)

(52) U.S. Cl.
CPC ......... *F02D 41/024* (2013.01); *F02D 35/025* (2013.01); *F02D 35/026* (2013.01);
(Continued)

(58) Field of Classification Search
CPC .......... F02D 41/02; F02D 41/04; F02D 43/00; F02D 45/00
See application file for complete search history.

(56) References Cited

U.S. PATENT DOCUMENTS 6,276,334 B1 * 8/2001 Flynn ............... F02B 19/14
123/435
6,938,613 B2 * 9/2005 Tamura ............... F01L 1/00
123/308
(Continued)

FOREIGN PATENT DOCUMENTS

JP       H04-241753 A    8/1992
JP       2008-25399      2/2008
(Continued)

*Primary Examiner* — Phutthiwat Wongwian
*Assistant Examiner* — Matthew T Largi
(74) *Attorney, Agent, or Firm* — Drinker Biddle & Reath LLP

(57) ABSTRACT

An engine control device controls a cylinder direct fuel injection type spark ignition engine provided with a fuel injection valve configured to directly inject fuel to a cylinder and an ignition plug configured to perform spark ignition for a gas mixture inside the cylinder. In a case where it is necessary to warm up an exhaust gas purifying catalyst disposed in an exhaust passage, the engine control device executes a catalyst warm-up operation in which a fuel is injected at a timing during the compression stroke, and at a timing when the fuel spray colliding with the piston crown surface moves toward the ignition plug along the shape of the piston crown surface, and in which the ignition timing is after compression top dead center. The engine control device advances the fuel injection timing in accordance with an increase in an estimation amount of a liquid fuel remaining on the top surface of the piston during execution of the catalyst warm-up operation.

6 Claims, 6 Drawing Sheets

(51) Int. Cl.
  *F02D 41/34* (2006.01)
  *F02P 5/15* (2006.01)
  *F02D 35/02* (2006.01)
  *F02D 41/14* (2006.01)
  *F02D 41/40* (2006.01)
  *F02D 43/04* (2006.01)
  *F02D 41/04* (2006.01)
  *F02D 41/30* (2006.01)

(52) U.S. Cl.
  CPC ....... *F02D 41/0245* (2013.01); *F02D 41/047* (2013.01); *F02D 41/06* (2013.01); *F02D 41/064* (2013.01); *F02D 41/1466* (2013.01); *F02D 41/3029* (2013.01); *F02D 41/34* (2013.01); *F02D 41/345* (2013.01); *F02D 41/401* (2013.01); *F02D 41/402* (2013.01); *F02D 43/04* (2013.01); *F02P 5/15* (2013.01); *Y02T 10/46* (2013.01)

(56) References Cited

U.S. PATENT DOCUMENTS

| | | | |
|---|---|---|---|
| 2003/0070637 A1* | 4/2003 | Majima | F01L 9/04 123/90.15 |
| 2007/0023005 A1* | 2/2007 | Chmela | F02B 1/12 123/305 |
| 2012/0097128 A1 | 4/2012 | Kihara et al. | |
| 2014/0182557 A1* | 7/2014 | Arihara | F02D 41/047 123/472 |

FOREIGN PATENT DOCUMENTS

| | | | |
|---|---|---|---|
| JP | 2009-103014 A | | 5/2009 |
| JP | 2009103014 A | * | 5/2009 |
| JP | 2011-220210 A | | 11/2011 |
| JP | 2013-217379 A | | 10/2013 |

* cited by examiner

ENGINE CONTROL DEVICE AND ENGINE CONTROL METHOD

TECHNICAL FIELD

The present invention relates to an engine control device and an engine control method for controlling a cylinder direct fuel injection type spark ignition engine.

BACKGROUND ART

In general, an exhaust passage of an engine has a catalyst device for purifying an exhaust gas. The catalyst supported by the catalyst device fails to provide an excellent catalyst performance at a temperature lower than an activation temperature. Therefore, it is necessary to perform a warm-up operation for increasing a temperature of the catalyst to the activation temperature within a short time, at the time of engine start. JP2011-220210A discloses a warm-up operation for increasing the temperature of the catalyst in which the exhaust gas is heated by retarding an ignition timing. In addition, in the warm-up operation disclosed in the aforementioned document, in order to secure a good ignitability even by retarding the ignition timing, so-called stratified charge combustion is performed, in which spark ignition is generated while a fuel spray is concentrated in the vicinity of an ignition plug.

However, in the warm-up operation disclosed in the aforementioned document, if a heater is turned on even when a condition for performing the warm-up operation of the catalyst is established, homogeneous stoichiometric combustion is performed by retarding the ignition timing. Although such a warm-up operation is effective to secure a heating performance, it is not satisfactory for emission reduction. In particular, in the aforementioned document, there is no consideration for a liquid fuel amount adhered to a piston crown surface which is important to suppress the amount of particulate matters (PM) of the exhaust gas. Therefore, it is difficult to reduce a PM discharge amount (hereinafter, also referred to as a particulate number (PN)).

In view of the aforementioned problems, it is an object of the present invention to control the engine by activating the catalyst early and reducing the PN.

SUMMARY OF INVENTION

According to one embodiment of this invention, an engine control device for controlling a cylinder direct fuel injection type spark ignition engine provided with a fuel injection valve configured to directly inject fuel into a cylinder and an ignition plug configured to perform spark ignition for a gas mixture inside the cylinder is provided. In a case where it is necessary to warm up an exhaust gas purifying catalyst disposed in an exhaust passage, the engine control device executes a catalyst warm-up operation in which a fuel is injected at a timing during the compression stroke, and at a timing when the fuel spray colliding with the piston crown surface moves toward the ignition plug along the shape of the piston crown surface, and in which the ignition timing is after compression top dead center. The engine control device advances the fuel injection timing in accordance with an increase in an estimation amount of a liquid fuel remaining on the top surface of the piston during execution of the catalyst warm-up operation.

DESCRIPTION OF EMBODIMENTS

Embodiments of the present invention will now be described with reference to the accompanying drawings.

<First Embodiment>

Figure 1:
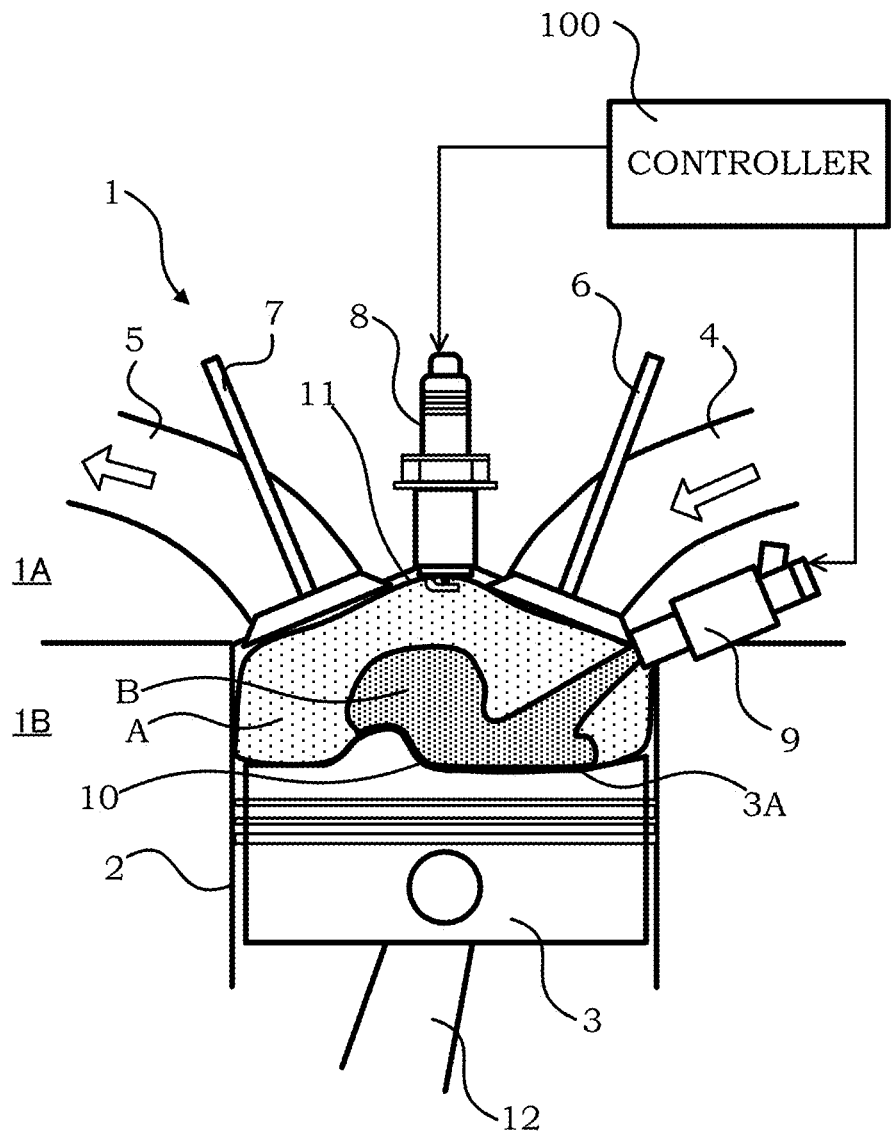
FIG. 1 is a schematic diagram illustrating an engine according to a first embodiment.

FIG. 1 is a schematic diagram illustrating a combustion chamber of a cylinder direct fuel injection type spark ignition engine 1 according to this embodiment (hereinafter, also referred to as an "engine") and its vicinity. Note that, although FIG. 1 illustrates a single cylinder, this embodiment is also applicable to a multi-cylinder engine.

A cylinder block 1B of the engine 1 is provided with a cylinder 2. A piston 3 is reciprocatably housed in the cylinder 2. The piston 3 is connected to a crankshaft (not shown) through a connecting rod 12, so that it reciprocates by rotating the crankshaft. In addition, the piston 3 has a cavity 10 formed on a top surface 3A (hereinafter, also referred to as a piston crown surface 3A) as described below.

A cylinder head 1A of the engine 1 has a hollowed combustion chamber 11. The combustion chamber 11 is a so-called pent roof type, in which pair of intake valves 6 are provided on a slope surface of the intake side, and pair of exhaust valves 7 are provided on a slope surface of the exhaust side, respectively. In addition, an ignition plug 8 is arranged in a substantial center position of the combustion chamber 11 surrounded by a pair of intake valves 6 and a pair of exhaust valves 7 along an axial line of the cylinder 2.

In addition, in a position of the cylinder head 1A, which is sandwiched by the pair of intake valves 6 are inserted, the fuel injection valve 9 is arranged to face the combustion chamber 11. A directivity of the fuel spray injected from the fuel injection valve 9 will be described below.

The intake valve 6 and the exhaust valve 7 are driven by a valve timing control mechanism (not shown). As the valve timing control mechanism, any mechanism may be employed as long as valve timings of the intake valve 6 and the exhaust valve 7, that is, a valve open timing and a valve close timing can be changed so as to generate a valve overlap period in which both the intake valve 6 and the exhaust valve 7 are open. Note that the valve open timing refers to a timing for initiating a valve open operation, and the valve close timing refers to a timing for terminating a valve close operation. According to this embodiment, a valve timing control mechanism well known in the art for changing the rotational phases of a cam shaft driving the intake valve 6 and a cam shaft driving the exhaust valve 7 with respect to the crankshaft is used. Note that a valve timing control mechanism well known in the art, capable of changing operation angles as well as the rotational phases of the intake valve and the exhaust valve, may also be employed.

An exhaust gas purifying catalyst for purifying the exhaust gas of the engine 1 is disposed on the downstream side of the exhaust gas flow of the exhaust passage 5. The exhaust gas purifying catalyst is, for example, a three-way catalyst.

The piston 3 is provided with the cavity 10 on the piston crown surface 3A as described above. The cavity 10 is provided in a position biased to the intake side of the piston crown surface 3A. In addition, the fuel injection valve 9 is placed such that a fuel spray is directed to the cavity 10 when fuel is injected in the vicinity of the top dead center of the piston 3. The fuel spray colliding with the cavity 10 swirls upward along a wall surface of the cavity 10 and is directed to the ignition plug 8.

Note that a fuel injection amount, a fuel injection timing, an ignition timing, and the like of the engine 1 are controlled by a controller 100 according to an operation state of the engine 1. Note that the fuel injection timing refers to a timing for initiating fuel injection. In addition, in order to execute this control, the engine 1 is provided with various detectors such as a crankshaft angle sensor, a coolant temperature sensor, and an air flowmeter for detecting the intake air amount.

Next, a control performed at the start of the engine 1 executed by the controller 100 will be described. In this embodiment, it is assumed that a fuel amount necessary for one combustion cycle is injected dividingly in two times. That is, so-called two-stage injection is performed.

The exhaust gas purifying catalyst does not provide a sufficient purification performance at a temperature lower than the activation temperature. For this reason, during a cold start operation in which the exhaust gas purifying catalyst has a temperature lower than the activation temperature, it is necessary to increase the temperature of the exhaust gas purifying catalyst earlier. For this purpose, the controller 100 executes super-retard stratified charge combustion in order to activate the exhaust gas purifying catalyst earlier when the exhaust gas purifying catalyst has an inactive state in an idling operation immediately after the cold starting. Note that the super-retard stratified charge combustion is well known in the art (refer to JP 2008-25535 A).

In the super-retard stratified charge combustion, the controller 100 sets the ignition timing within a first half of an expansion stroke, for example, to 15 to 30° after the compression top dead center. In addition, the controller 100 sets the first fuel injection timing to a first half of the intake stroke and sets the second fuel injection timing within a second half of the compression stroke at the timing capable of allowing the fuel spray to reach the vicinity of the ignition plug 8 until the ignition timing. For example, the second fuel injection timing is set to 50 to 60° preceding the compression top dead center.

Here, the first fuel injection amount and the second fuel injection amount will be described.

An air-fuel ratio of the exhaust gas discharged in the super-retard stratified charge combustion described above is stoichiometric (a stoichiometric air-fuel ratio). Similar to a general method for setting the fuel injection amount, the controller 100 calculates a fuel amount by which the fuel can be totally combusted with the intake air amount per one combustion cycle (hereinafter, also referred to as a total fuel amount). A part of this total fuel amount, for example, 50 to 90 weight % is used as the first injection amount, and the remaining fuel amount is used as the second injection amount.

If the fuel injection amount is set as described above, the fuel spray injected in the first fuel injection is diffused inside the cylinder 2 without colliding with the cavity 10 and is mixed with the air to form a homogeneous gas mixture leaner than the stoichiometric state in the entire area of the combustion chamber 11. In addition, the fuel spray injected in the second fuel injection collides with the cavity 10 and swirls upward, so that it reaches the vicinity of the ignition plug 8, and a gas mixture richer than the stoichiometric state is concentrated in the vicinity of the ignition plug 8. As a result, the gas mixture inside the combustion chamber 11 becomes a stratified state. If spark ignition is generated by the ignition plug 8 in this state, combustion resistant to a disturbance is performed while suppressing generation of accidental fire or smoke. Although the aforementioned combustion is the stratified charge combustion, this combustion will be referred to as "super-retard stratified charge combustion" in order to distinguish from typical stratified charge combustion in which the ignition timing precedes the compression top dead center.

In the super-retard stratified charge combustion described above, compared to the homogeneous stoichiometric combustion of the prior art, it is possible to increase the exhaust gas temperature and reduce a hydrocarbon (HC) discharge amount discharged from the combustion chamber 11 to the exhaust passage 5. That is, using the super-retard stratified charge combustion, it is possible to implement early activation of the exhaust gas purifying catalyst while suppressing hydrocarbon from being discharged to the atmosphere until the activation of the exhaust gas purifying catalyst from the starting initiation, compared to a case where only the homogeneous stoichiometric combustion of the prior art is performed, a case where only the stratified charge combustion is performed, or a case where additional fuel is injected in addition to the homogeneous stoichiometric combustion and the stratified charge combustion after a second half of the combustion (after the expansive stroke or during the exhaust stroke), to perform a warm-up operation.

Meanwhile, a part of the fuel colliding with the piston crown surface 3A during execution of the super-retard stratified charge combustion does not swirl toward the ignition plug 8 and is adhered to the piston crown surface 3A. Even when the fuel is adhered to the piston crown surface 3A, the fuel does not remain on the piston crown surface 3A if the adhered fuel is vaporized and combusted in the corresponding combustion cycle. However, since the super-retard stratified charge combustion is executed during the cold starting, it is difficult to vaporize the adhered fuel until the temperature of the piston crown surface 3A increases. Furthermore, the fuel does not remain on the piston crown surface 3A if the adhered fuel is combusted as a combustion flame propagates during the combustion cycle. However, since the combustion is initiated during the expansion stroke in the super-retard stratified charge combustion, the combustion flame does not reach the piston crown surface 3A. Even if it reaches the piston crown surface 3A, the temperature decreases in the second half of the expansion stroke. Therefore, it is difficult to burn out the adhered fuel during the corresponding cycle. Note that a phenomenon in which the liquid fuel remaining on the piston crown surface 3A is ignited and combusted by the combustion flame is called "pool fire."

Therefore, for a predetermined period after the cold starting, the amount of the liquid fuel remaining on the piston crown surface 3A continuously increases. Here, the predetermined period refers to a period until the amount of the liquid fuel remaining on the piston crown surface 3A vaporized during one combustion cycle is larger than the amount of the fuel adhered to the piston crown surface 3A for one combustion cycle.

That is, if the super-retard stratified charge combustion is continuously performed over the predetermined period, the amount of the liquid fuel remaining on the piston crown surface 3A is slowly reduced. However, in some cases, the super-retard stratified charge combustion is switched to the homogeneous stoichiometric combustion while the liquid fuel remains on the piston crown surface 3A before the predetermined time elapses. For example, this may happen when the exhaust gas purifying catalyst is activated, or when the accelerator pedal is depressed for acceleration. Note that the homogeneous stoichiometric combustion referred to herein is a combustion mode in which a gas mixture having a stoichiometric air-fuel ratio is formed in the entire combustion chamber 11, and spark ignition is performed at the optimum ignition timing (minimum advance for best torque (MBT)).

If the combustion mode is switched to the homogeneous stoichiometric combustion while the liquid fuel remains on the piston crown surface 3A, the combustion flame reaches the piston crown surface 3A at a high temperature to generate pool fire, so that the remaining liquid fuel is combusted. In this manner, if the liquid fuel accumulated until this combustion cycle is combusted, the PN tends to increase.

In this regard, according to this embodiment, in order to suppress an increase of the PN caused by the combustion of the liquid fuel, the controller 100 executes the following control.

Figure 2:
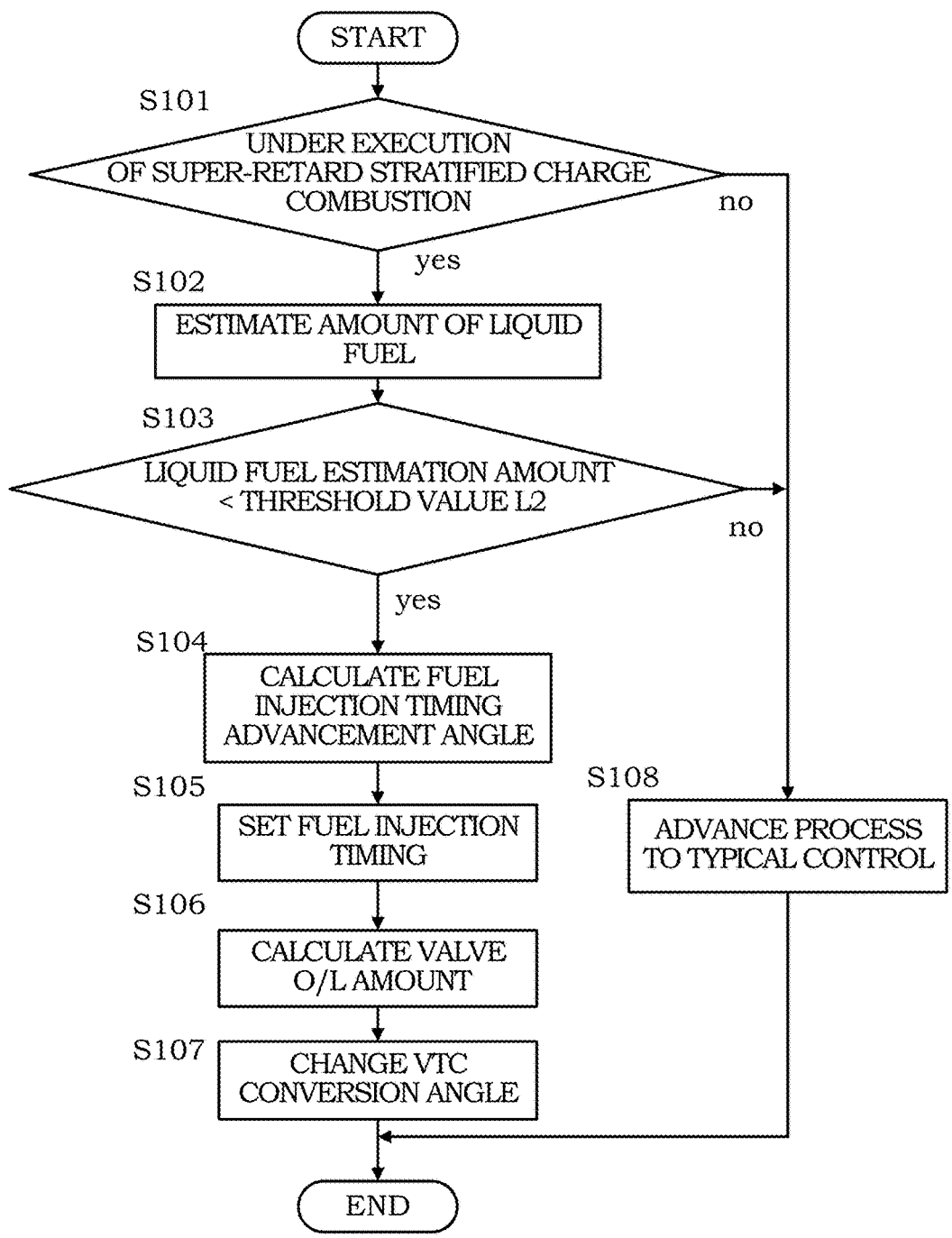
FIG. 2 is a flowchart illustrating a control routine for suppressing an increase of the PN.

FIG. 2 is a flowchart illustrating a control routine for suppressing an increase of eh PN executed by the controller 100. Note that this routine is repeatedly executed with a short interval, for example, 10 milliseconds.

In this routine, the second injection timing of the two-stage injection is changed according to the liquid fuel amount remaining on the piston crown surface 3A in order to suppress the liquid fuel amount remaining on the piston crown surface 3A (hereinafter, simply referred to as a "liquid fuel amount"). The steps of the flowchart will now be described.

In step S101, the controller 100 determines whether or not the super-retard stratified charge combustion is under execution. If the super-retard stratified charge combustion is under execution, the processing of step S102 is executed. Otherwise, if the super-retard stratified charge combustion is not under execution, a processing for switching to the homogeneous stoichiometric combustion (hereinafter, referred to as a typical control) is performed is step S108. Whether or not the super-retard stratified charge combustion is under execution is determined on the basis of a temperature of the exhaust gas purifying catalyst. Specifically, if the temperature of the exhaust gas purifying catalyst is lower than the activation temperature, it is determined that the super-retard stratified charge combustion is under execution. If the temperature of the exhaust gas purifying catalyst is equal to or higher than the activation temperature, it is determined that the super-retard stratified charge combustion is not under execution. Note that, if there is an acceleration request even when the temperature of the exhaust gas purifying catalyst is lower than the activation temperature, the controller 100 executes the processing of step S108. Whether or not there is an acceleration request may be determined on the basis of a detection value of an acceleration pedal opening level sensor (not shown). For example, it may be determined that there is an acceleration request when the accelerator pedal is depressed or when the opening level is higher than a predetermined level. Alternatively, it may be determined that there is an acceleration request when the accelerator pedal is depressed, and a change rate of the acceleration pedal opening level is equal to or higher than a predetermined value.

In step S102, the controller 100 estimates the liquid fuel amount. According to this embodiment, the liquid fuel amount is estimated on the basis of a wall temperature of the cylinder 2 (hereinafter, also referred to as a cylinder wall temperature) and a time elapsing from the engine starting. Specifically, first, on the basis of a fact that the liquid fuel more easily remains on the piston crown surface 3A as the cylinder bore wall temperature decreases, a remaining amount per unit time is established for each cylinder bore wall temperature, and the time elapsing after the engine starting is integrated into this value, so that the accumulated amount of the fuel adhered to the piston crown surface 3A is calculated. Then, a vaporization amount described below is subtracted from this accumulated amount, and its result is set as a liquid fuel estimation amount.

Note that, although the temperature of the piston crown surface 3A directly relates to easiness of the remaining liquid fuel, the cylinder bore wall temperature is employed here because it relates to the temperature of the piston crown surface 3A, and it can be estimated from a detection value of the existing coolant temperature sensor.

The aforementioned vaporization amount refers to the amount of fuel vaporized out of the fuel adhered to the piston crown surface 3A. Vaporization more easily occurs as the temperature of the fuel increases. Therefore, the vaporization amount increases as the temperature of the piston crown surface 3A increases.

In step S103, the controller 100 determines whether or not the liquid fuel amount estimated in step S102 (hereinafter, also referred to as a liquid fuel estimation amount) is smaller than a predetermined threshold value L2. If the liquid fuel estimation amount is smaller than the threshold value L2, the controller 100 executes the processing of step S104. Otherwise, if the liquid fuel estimation amount is equal to or larger than the threshold value L2, the processing of step S108 is executed.

The threshold value L2 employed in this step is a value that can satisfy the emission regulation value of the PN even when the combustion is switched from the super-retard stratified charge combustion to the homogeneous stoichiometric combustion.

In step S104, the controller 100 calculates an advancement angle of the second fuel injection timing of the two-stage injection (hereinafter, also referred to as a fuel injection timing advancement angle ADV) against a basic fuel injection timing as described below. The basic fuel injection timing is a timing at which the fuel spray collides with the cavity 10 during the compression stroke. A specific value of the basic fuel injection timing is set appropriately according to a specification of a vehicle to which this embodiment is applied. According to this embodiment, the basic fuel injection timing is set to 50 to 60° preceding the compression top dead center as described above. Note that the unit of the "advancement angle" and the "retardation angle" according to this embodiment is a crank angle.

Figure 3:
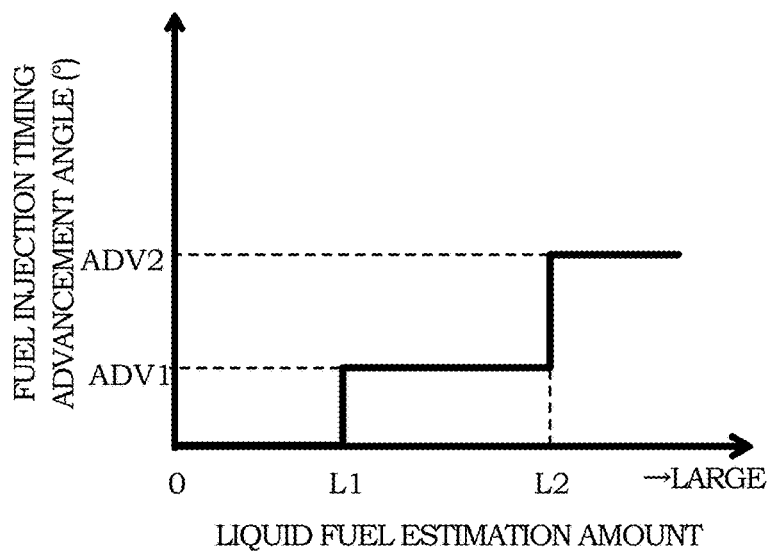
FIG. 3 is a table in which fuel injection timing advancement angles used in the control of the first embodiment are established.

The fuel injection timing advancement angle ADV is calculated, for example, by preparing a table of FIG. 3 in advance, storing it in the controller 100, and searching this table with a liquid fuel estimation amount.

In FIG. 3, the ordinate refers to the fuel injection timing advancement angle ADV, and the abscissa refers to a liquid fuel estimation amount L. The fuel injection timing advancement angle ADV is set to zero if the liquid fuel estimation amount L is within a range "0≤L<threshold value L1." If the liquid fuel estimation amount L is within a range "threshold value L1≤L<threshold value L2," the fuel injection timing advancement angle ADV is set to "ADV1." If "L≥threshold value L2," the fuel injection timing advancement angle ADV is set to "ADV2." The fuel injection timing advancement angle ADV1 is set to a timing at which a part of the fuel spray collides with the cavity 10 during the compression stroke of the fuel injection timing. The fuel injection timing advancement angle ADV2 is set to a timing at which the fuel spray does not collide with the cavity 10 during the intake stroke of the fuel injection timing. The threshold value L1 is a predetermined value. A specific value of the threshold value L1 is set according to a specification of a vehicle to which this embodiment is applied.

Alternatively, a table of the fuel injection timing advancement angle set for each temperature of the piston crown surface 3A may be prepared in advance, and a value of the table may be selected according to the temperature of the piston crown surface 3A when the fuel injection timing advancement angle is calculated in step S104. In this case, the table is set such that the fuel injection timing advancement angle is set to be larger as the temperature of the piston crown surface 3A decreases. That is, in the table, the fuel injection timing advancement angle of FIG. 3 is shifted upward as the temperature of the piston crown surface 3A decreases. Since the colliding fuel more easily remains as a liquid fuel as the temperature of the piston crown surface 3A decreases, it is possible to more reliably suppress an increase of the liquid fuel amount remaining on the piston crown surface 3A by calculating the fuel injection timing advancement angle ADV1 as described above.

In step S105, the controller 100 sets the fuel injection timing. Specifically, a new fuel injection timing is calculated from the basic fuel injection timing for the super-retard stratified charge combustion and the fuel injection timing advancement angle ADV calculated in step S104.

Figure 4:
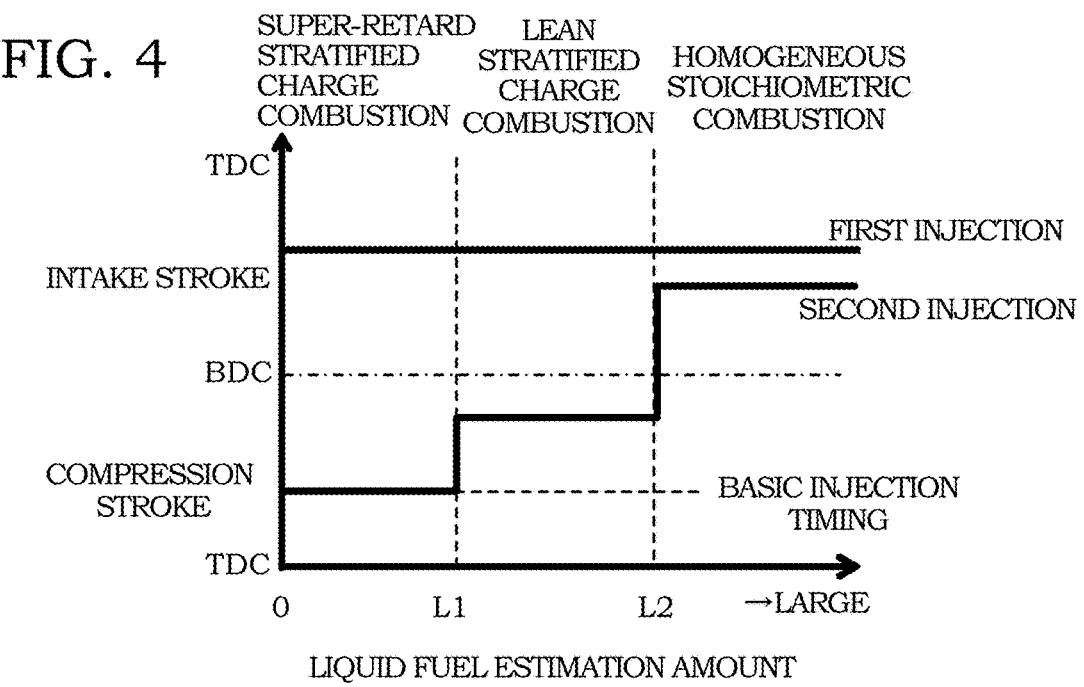
FIG. 4 is a diagram illustrating a fuel injection timing when the control of the first embodiment is executed.

FIG. 4 is a diagram illustrating an exemplary fuel injection timing when the processing of steps S104 and S105 is executed. In FIG. 4, the ordinate refers to the crank angle, and the abscissa refers to the liquid fuel estimation amount L. If the liquid fuel estimation amount L is smaller than the threshold value L1, the fuel injection timing is still the basic injection timing.

If the liquid fuel estimation amount L is equal to or larger than the threshold value L1 and smaller than the threshold value L2, the fuel injection timing is advanced from the basic injection timing by the fuel injection timing advancement angle ADV1. In this case, a part of the fuel spray collides with the cavity 10 as described above. Therefore, a stratified mixture is formed in the vicinity of the ignition plug 8 although it is smaller relative to the case of the basic fuel injection timing. Combustion performed by generating spark ignition in this state is referred to as "lean stratified charge combustion."

If the liquid fuel estimation amount L is equal to or larger than the threshold value L2, intake stroke injection is performed while the fuel injection timing is advanced from the basic injection timing by the fuel injection timing advancement angle ADV2. If the intake stroke injection is performed, the fuel spray is diffused and mixed until the ignition timing, so that a homogeneous gas mixture is formed in the entire area of the cylinder. Therefore, the combustion mode becomes homogeneous stoichiometric combustion.

As described above, the controller 100 advances the fuel injection timing as the liquid fuel estimation amount L increases. More specifically, if the liquid fuel estimation amount L becomes equal to or larger than the threshold value L1, the controller 100 advances the fuel injection timing to switch to the lean stratified charge combustion. As a result, the fuel amount colliding with the cavity 10 is reduced, compared to the case of the super-retard stratified charge combustion. Therefore, it is possible to suppress an increase of the fuel amount remaining on the piston crown surface 3A. If the liquid fuel estimation amount L is equal to or larger than the threshold value L2, the controller 100 advances the fuel injection timing until the intake stroke and switches the combustion mode to the homogeneous stoichiometric combustion. As a result, the fuel spray is not adhered to the cavity 10. Therefore, it is possible to further suppress an increase of the fuel amount remaining on the piston crown surface.

Note that the controller 100 controls the ignition timing according to an operation state in a separate flow (not shown). In addition, although the controller 100 retards the ignition timing to be later than the MBT in the case of the super-retard stratified charge combustion, the controller 100 also advances the ignition timing according to the new fuel injection timing.

The description will return to the flowchart.

In step S106, the controller 100 calculates the valve overlap period on the basis of the liquid fuel estimation amount L. The valve overlap period herein refers to a period during which the intake valve 6 and the exhaust valve 7 are continuously opened as expressed in terms of the crank angle.

Figure 5:
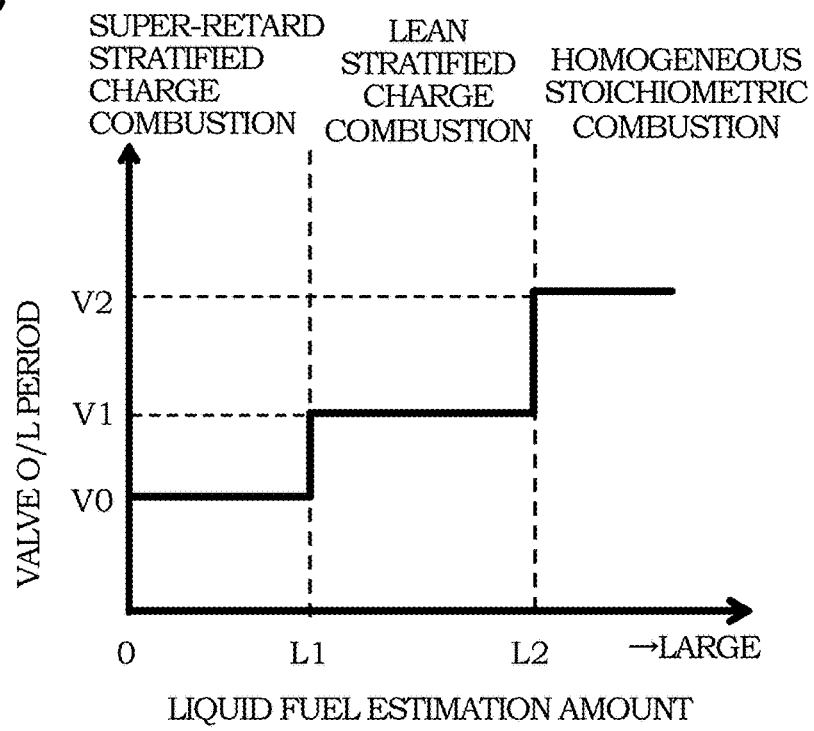
FIG. 5 is a table in which a length of a valve overlap period used in the control of the first embodiment is established.

In FIG. 5, the ordinate refers to the valve overlap period, and the abscissa refers to the liquid fuel estimation amount L. In FIG. 5, the valve overlap period is set to a basic valve overlap period V0 if the liquid fuel estimation amount L has a range "0≤L<L1." Meanwhile, the valve overlap period is set to V1 if "L1≤L<L2." In addition, the valve overlap period is set to V2 if "L≥L2." Here, a relationship of "V0<V1<V2" is established.

As the valve overlap period increases, a so-called internal EGR gas amount increases. Therefore, an internal cylinder temperature from the intake stroke to the ignition timing becomes higher. As the internal cylinder temperature becomes higher, the temperature of the piston crown surface 3A also becomes higher, so that vaporization of the liquid fuel adhered to the cavity is promoted. In this regard, in the table of FIG. 5, the valve overlap period is set to increase as the liquid fuel estimation amount increases.

Alternatively, a table of the valve overlap period may be prepared for each temperature of the piston crown surface 3A, and a value of the table may be selected according to the temperature of the piston crown surface 3A when the fuel injection timing advancement angle is calculated in step S106. In this case, the table is created such that the valve overlap period is set to be longer as the temperature of the piston crown surface 3A decreases. That is, the valve overlap period of FIG. 5 is shifted upward as the temperature of the piston crown surface 3A decreases. Since the colliding fuel more easily remains as the liquid fuel as the temperature of the piston crown surface 3A decreases, it is possible to more reliably suppress an increase of the liquid fuel amount remaining on the piston crown surface 3A by calculating the valve overlap period as described above.

In step S107, the controller 100 changes the valve overlap period by setting a conversion angle of the valve timing control mechanism for implementing the valve overlap period calculated in step S106. More specifically, the valve timings of the intake valve 6 and the exhaust valve 7 are calculated on the basis of the method described below, and the conversion angles of the intake-side and exhaust-side valve timing control mechanisms are changed on the basis of the calculation result.

Figure 6:
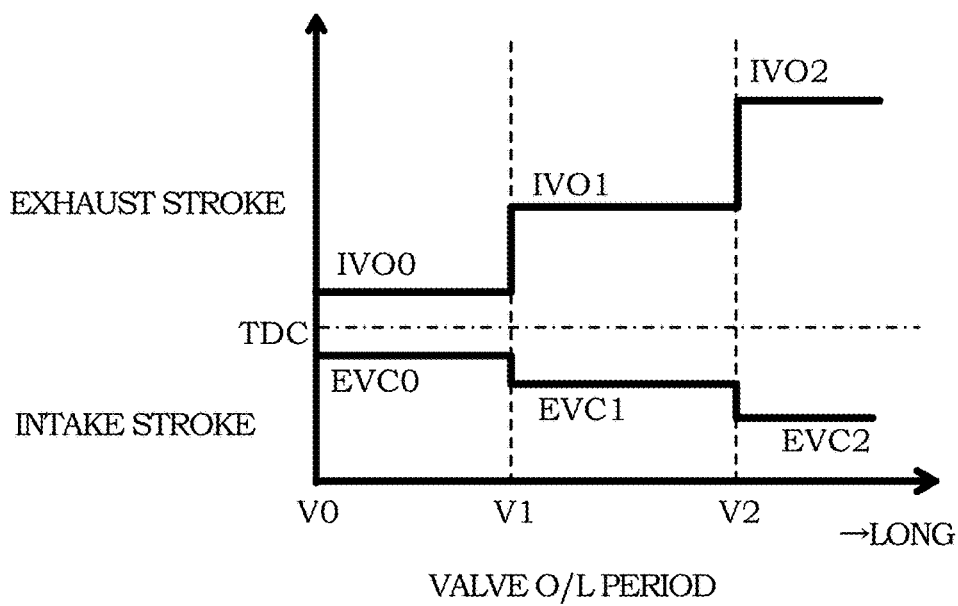
FIG. 6 is a table in which a valve timing for implementing the valve overlap period calculated from the table of FIG. 5 is established.

FIG. 6 is a table for calculating an open timing of the intake valve 6 (IVO in FIG. 6) and a close timing of the exhaust valve 7 (EVC in FIG. 6) for implementing the valve overlap period calculated in step S106. In FIG. 6, the ordinate refers to the valve timing, and the abscissa refers to the valve overlap period. In the case of the basic valve overlap period V0, the intake valve open timing is set to IVO0, and the exhaust valve close timing is set to EVC0. In the case of the valve overlap period V1, the intake valve open timing is set to IVO1 advanced from IVO0, and the exhaust valve close timing is set to EVC1 retarded from EVC0. In the case of the valve overlap period V2, the intake valve open timing is set to IVO2 advanced from IVO1, and the exhaust valve close timing is set to EVC2 retarded from EVC1. In this manner, even when the valve overlap period is set to any length, the intake valve open timing and the exhaust valve close timing are set such that the exhaust top dead center is interposed therebetween.

The advancement angle of the open timing of the intake valve 6 is larger than the retardation angle of the close timing of the exhaust valve 7. This is because, as the close timing of the exhaust valve 7 is retarded, a blowout amount of the intake air increases, so that cylinder volumetric efficiency is degraded. That is, if the valve overlap period increases by predominantly advancing the open timing of the intake valve 6 as described in this embodiment, it is possible to suppress degradation of the cylinder volumetric efficiency.

Note that, in the flowchart of FIG. 2, the processing of steps S106 to S107 may be executed before the processing of steps S104 to S105.

The control routine described above can be summarized as follows. First, the controller 100 estimates the liquid fuel amount remaining on the piston crown surface 3A during the super-retard stratified charge combustion. If the liquid fuel estimation amount is equal to or larger than the threshold value L2, the controller 100 switches the combustion mode from the super-retard stratified charge combustion to the typical control. If the liquid fuel estimation amount is smaller than the threshold value L2, the controller 100 advances the fuel injection timing and increases the valve overlap period according to an increase of the liquid fuel estimation amount.

Next, effects of this embodiment will be described.

According to this embodiment, in a case where it is necessary to warm up the exhaust gas purifying catalyst disposed in the exhaust passage 5, the controller 100 performs a control such that the fuel is injected at the fuel injection timing at which the fuel spray collides with the piston crown surface 3A, and the colliding fuel spray is directed toward the ignition plug 8 according to the shape of the piston crown surface 3A, and the catalyst warm-up operation in which spark ignition is performed after the compression top dead center (super-retard stratified charge combustion) is executed. In addition, during the execution of the super-retard stratified charge combustion, the controller 100 advances the fuel injection timing as the estimation amount of the liquid fuel remaining on the piston crown surface 3A increases. By advancing the fuel injection timing, the amount of the fuel colliding with the piston crown surface 3A is reduced. Therefore, the liquid fuel amount remaining on the piston crown surface 3A is reduced. As a result, it is possible to reduce the PN.

According to this embodiment, if the estimation amount of the liquid fuel remaining on the piston crown surface 3A exceeds the threshold value set on the basis of the emission regulation value of the exhaust gas particulate matter, the fuel injection timing is advanced to the intake stroke from the timing at which the fuel spray collides with the piston crown surface 3A and is directed to the ignition plug during the compression stroke. As a result, a distance from the fuel injection valve 9 to the piston crown surface 3A increases at the fuel injection timing, so that the fuel spray does not collide with the piston crown surface 3A. Therefore, it is possible to suppress an increase of the liquid fuel remaining on the piston crown surface 3A.

Note that, if the fuel injection timing during the compression stroke is in the vicinity of the bottom dead center, the distance between the fuel injection valve 9 and the piston crown surface 3A is reduced by advancing the fuel injection timing to the intake stroke. However, if the advanced fuel injection timing is the fuel injection timing at which the fuel spray does not collide with the piston crown surface 3A, for example, 100° preceding the bottom dead center, it is possible to obtain an effect that an increase of the liquid fuel remaining on the piston crown surface 3A can be suppressed by advancing the fuel injection timing.

Even in the fuel injection timing at which the fuel spray is adhered to the piston crown surface 3A by advancing the fuel injection timing, a time elapsing to the spark ignition after the fuel is adhered to the piston crown surface 3A, that is, a time for vaporizing the adhered fuel increases. In particular, the atmospheric temperature inside the cylinder increases by virtue of the compression effect after initiation of the compression stroke, so that vaporization is promoted. Therefore, even at the fuel injection timing in which the fuel spray is adhered to the piston crown surface 3A by the angle advancement, if the amount of the adhered fuel is small, it is possible to suppress an increase of the liquid fuel remaining on the piston crown surface 3A.

As described above, it is difficult to absolutely say that the amount of the liquid fuel remaining on the piston crown surface 3A increases by expediting the fuel injection timing to precede the bottom dead center. A fact that it is possible to suppress an increase of the liquid fuel remaining on the piston crown surface 3A by advancing the fuel injection timing from the compression stroke to the intake stroke is based on any of the aforementioned two mechanisms, that is, a mechanism in which the amount of fuel colliding with the piston crown surface 3A is reduced, or a mechanism in which the vaporization time for the adhered fuel increases by the collision.

According to this embodiment, as the estimation amount of the liquid fuel remaining on the piston crown surface 3A increases, the fuel injection timing gradually approaches the intake stroke. That is, as the liquid fuel estimation amount increases, the combustion mode is switched from the super-retard stratified charge combustion to the lean stratified charge combustion. As a result, it is possible to promote the warm-up operation of the exhaust gas purifying catalyst by virtue of the lean stratified charge combustion while suppressing an increase of the liquid fuel remaining on the piston crown surface 3A.

According to this embodiment, the advancement angle of the fuel injection timing described above is set to be larger as the temperature of the piston crown surface 3A decreases. As the temperature of the piston crown surface 3A decreases, the colliding fuel spray more easily remains on the piston crown surface 3A. Therefore, according to this embodiment, it is possible to more reliably reduce the amount of the liquid fuel remaining on the piston crown surface 3A.

According to this embodiment, at least during execution of the warm-up operation (super-retard stratified charge combustion), a part of the fuel is injected even in the intake stroke. That is, a two-stage injection is performed such that the fuel is injected in both the intake stroke and the compression stroke. The fuel injected in the intake stroke forms a homogeneous gas mixture leaner than the stoichiometric air-fuel ratio inside the combustion chamber 11. If spark ignition occurs in this state, combustion resistant to a disturbance is performed.

According to this embodiment, during execution of the super-retard stratified charge combustion, the controller 100 increases the valve overlap period such that the temperature of the piston crown surface increases as the estimation amount of the liquid fuel remaining on the piston crown surface 3A increases. An internal EGR amount increases as the valve overlap period increases, so that internal cylinder temperature increases starting from the intake stroke stage. Therefore, it is possible to promote vaporization of the liquid fuel. As a result, it is possible to reduce the PN.

According to this embodiment, the valve overlap period slowly increases as the estimation amount of the liquid fuel remaining on the piston crown surface 3A increases. That is, the control of the valve overlap period described above is executed even when the combustion mode is switched from the super-retard stratified charge combustion to the lean stratified charge combustion as the liquid fuel estimation amount increases. As a result, it is possible to promote the warm-up operation of the exhaust gas purifying catalyst by virtue of the lean stratified charge combustion while suppressing an increase of the liquid fuel remaining on the piston crown surface 3A.

According to this embodiment, a change value of the valve overlap period is set to be larger as the temperature of the piston crown surface 3A decreases. As the temperature of the piston crown surface 3A decreases, the colliding fuel spray easily remains on the piston crown surface 3A. Therefore, according to this embodiment, it is possible to more reliably reduce the liquid fuel amount remaining on the piston crown surface 3A.

<Second Embodiment>

A second embodiment is different from the first embodiment in the method of calculating the valve overlap period. The description will now be made by focusing on this difference.

Similarly, in this embodiment, the controller 100 executes the control routine of FIG. 2. As described above, the method of calculating the valve overlap period according to this embodiment is different from that of the first embodiment. That is, according to this embodiment, the processing of steps S106 to S107 of FIG. 2 is different from that of the first embodiment.

Figure 7:
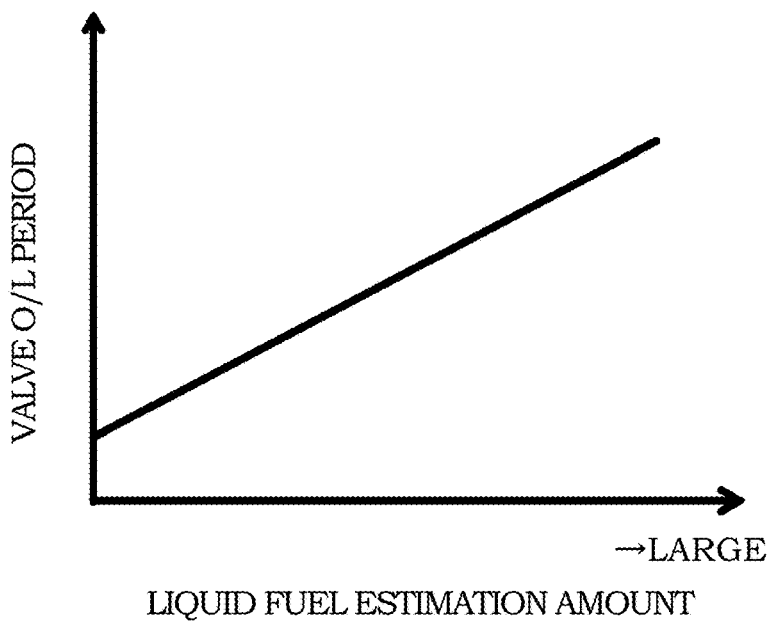
FIG. 7 is a table in which a length of the valve overlap period used in a control of a second embodiment is established.

FIG. 7 is a table used to calculate the valve overlap period in step S106. Unlike FIG. 5 used in the first embodiment, the valve overlap period increases in proportion to an increase of the liquid fuel estimation amount. As a result, it is possible to more accurately perform the control according to the liquid fuel estimation amount.

Note that, similar to the first embodiment, the table of FIG. 7 may be prepared for each temperature of the piston crown surface 3A, and the valve overlap period may be set to be longer as the temperature of the piston crown surface 3A decreases.

Figure 8:
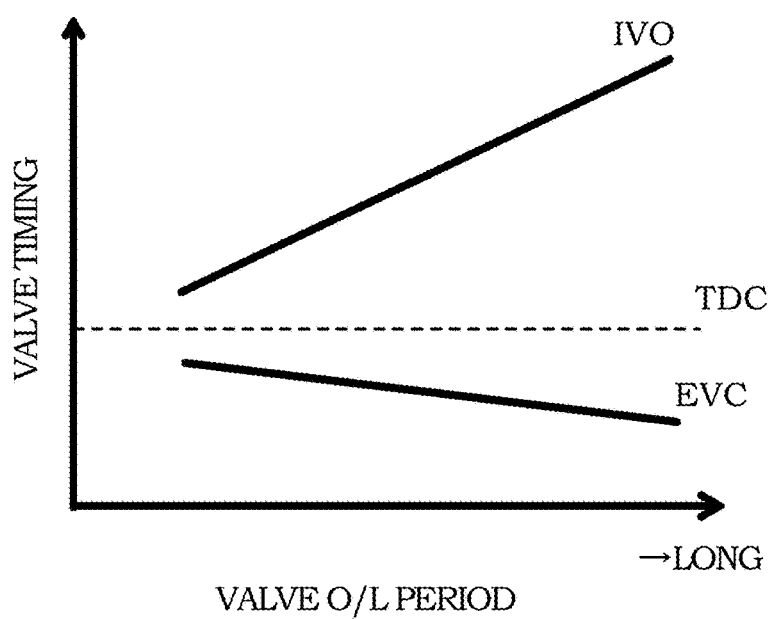
FIG. 8 is a table in which a valve timing for implementing the valve overlap period calculated in the table of FIG. 7 is established.

FIG. 8 is a table used to set the valve timings of the intake valve 6 and the exhaust valve 7 in step S107. The valve timings of the intake valve 6 and the exhaust valve 7 are proportional to the valve overlap period. That is, as the valve overlap period increases, the advancement angle of the open timing of the intake valve 6 and the retardation angle of the close timing of the exhaust valve 7 increase.

Note that the advancement angle of the open timing of the intake valve 6 is set to be larger than the retardation angle of the close timing of the exhaust valve 7 as the valve overlap period increases. This relationship is similar to that of FIG. 6 used in the first embodiment.

According to this embodiment, similar to the first embodiment, it is possible to suppress an increase of the liquid fuel. In addition, it is possible to more appropriately set the valve overlap period according to the liquid fuel estimation amount.

Note that each embodiment described above is not limited to a case where such stratified charge combustion is performed through the two-stage split injection. For example, single-stage injection may be performed by omitting the first fuel injection of the two-stage fuel injection described above. Therefore, the stratified charge combustion may be performed through only the second fuel injection.

Figure 9:
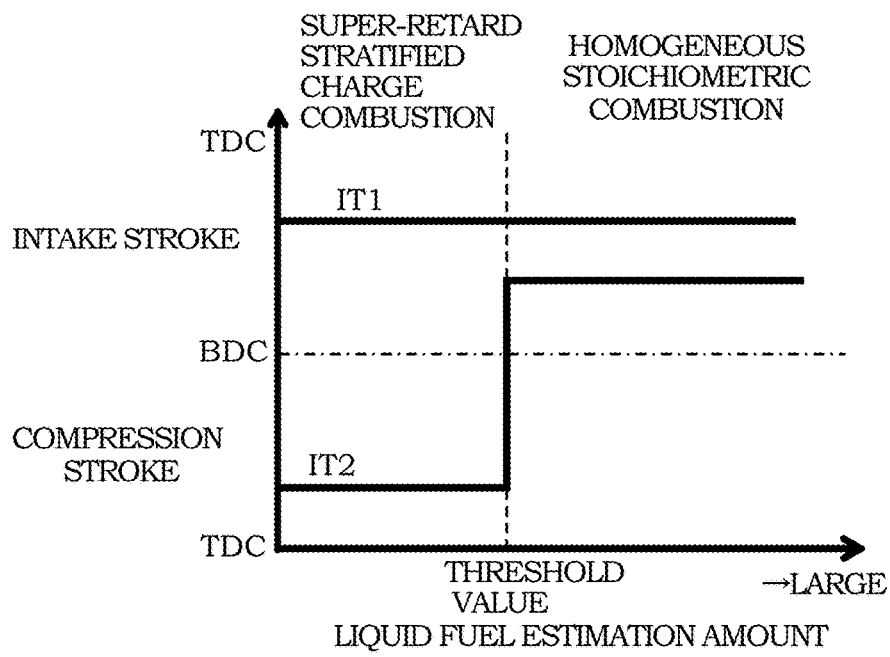
FIG. 9 is a diagram illustrating a fuel injection timing when there is no damper period.

As illustrated in FIG. 9, the controller 100 may switch the combustion mode to the homogeneous stoichiometric combustion when the liquid fuel estimation amount during execution of the super-retard stratified charge combustion becomes equal to or larger than a predetermined threshold value.

Figure 10:
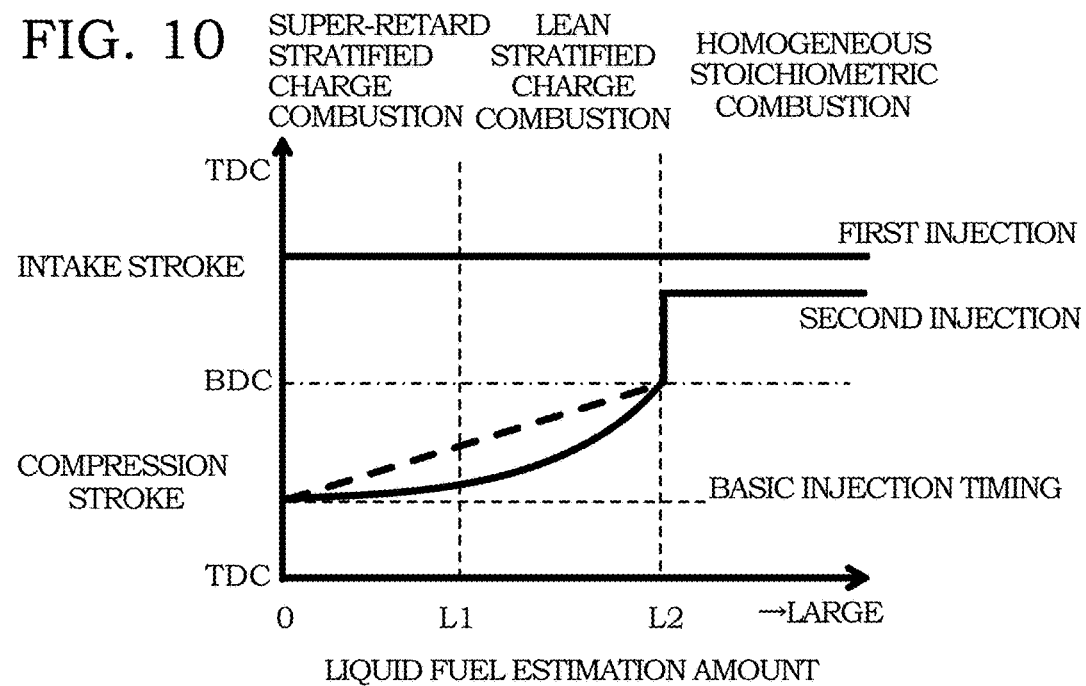
FIG. 10 is a diagram illustrating another example of the fuel injection timing.

The method "the fuel injection timing gradually approaches the intake stroke as the liquid fuel estimation amount increases" described above is not limited to a case where the fuel injection timing is advanced stepwise as illustrated in FIG. 4 or 9. For example, as indicated by the solid line or the dotted line in FIG. 10, the advancement angle of the fuel injection timing in a case where the liquid fuel estimation amount is smaller than the threshold value L2 may continuously increase as the liquid fuel estimation amount increases.

While the embodiments of the present invention have been described hereinbefore, the embodiments described above are just for illustrative purposes and are not intended to limit the technical scope of the present invention to a specific configuration of the embodiment.

The invention claimed is:

1. An engine control device for controlling a cylinder direct fuel injection type spark ignition engine, the engine comprising a fuel injection valve configured to directly inject fuel into a cylinder and an ignition plug configured to perform spark ignition for a gas mixture inside the cylinder,
wherein, the engine control device is programmed to execute a catalyst warm-up operation in which an ignition timing is retarded and a fuel injection timing is within a compression stroke when it is necessary to warm up an exhaust gas purifying catalyst disposed in an exhaust passage, and to advance the fuel injection timing within the compression stroke according to an estimation amount of a liquid fuel remaining on a piston crown surface during execution of the catalyst warm-up operation.

2. The engine control device according to claim 1, wherein, the engine control device is programmed to advance the fuel injection timing from a timing at which the fuel spray moves toward the spark plug to a timing during the intake stroke when the estimation amount of the liquid fuel remaining on the piston crown surface is larger than a threshold value set on the basis of an emission regulation value of an exhaust gas particulate matter.

3. The engine control device according to claim 2, wherein the fuel injection timing gradually approaches the intake stroke in accordance with the increase of the estimation amount of the liquid fuel remaining on the piston crown surface.

4. The engine control device according to claim 1, wherein an advancement angle of the fuel injection timing is set to be larger as the temperature of the piston crown surface is lower.

5. The engine control device according to claim 1, wherein a part of the fuel is also injected in an intake stroke at least during execution of the warm-up operation.

6. An engine control method for controlling a cylinder direct fuel injection type spark ignition engine, the engine comprising a fuel injection valve configured to directly inject fuel into a cylinder and an ignition plug configured to perform spark ignition for a gas mixture inside the cylinder, comprising:

executing a catalyst warm-up operation in which an ignition timing is retarded and a fuel injection timing is within a compression stroke when it is necessary to warm up an exhaust gas purifying catalyst disposed in an exhaust passage, and advancing the fuel injection timing within the compression stroke according to an estimation amount of a liquid fuel remaining on a piston crown surface during execution of the catalyst warm-up operation.

* * * * *